(12) United States Patent
Uwamori et al.

(10) Patent No.: US 10,009,737 B2
(45) Date of Patent: Jun. 26, 2018

(54) RELAYING DEVICE, VOICE COMMUNICATION SYSTEM AND VOICE COMMUNICATION METHOD

(71) Applicant: ICOM INCORPORATED, Osaka-shi, Osaka (JP)

(72) Inventors: Keishiro Uwamori, Osaka (JP); Hirotaka Sonobe, Osaka (JP)

(73) Assignee: ICOM INCORPORATED, Osaka-shi, Osaka (JP)

( * ) Notice: Subject to any disclaimer, the term of this patent is extended or adjusted under 35 U.S.C. 154(b) by 0 days. days.

(21) Appl. No.: 15/528,170

(22) PCT Filed: Sep. 11, 2015

(86) PCT No.: PCT/JP2015/075907
§ 371 (c)(1),
(2) Date: May 19, 2017

(87) PCT Pub. No.: WO2016/084459
PCT Pub. Date: Jun. 2, 2016

(65) Prior Publication Data
US 2017/0332211 A1 Nov. 16, 2017

(30) Foreign Application Priority Data
Nov. 28, 2014 (JP) .................................. 2014-241905

(51) Int. Cl.
*H04W 4/02* (2018.01)
*H04W 4/08* (2009.01)
(Continued)

(52) U.S. Cl.
CPC .......... *H04W 4/08* (2013.01); *H04B 7/15507* (2013.01); *H04W 4/02* (2013.01);
(Continued)

(58) Field of Classification Search
CPC ......... H04W 4/023; H04W 4/10; H04W 4/08; H04W 4/02; H04W 76/02; H04W 84/08
(Continued)

(56) References Cited

U.S. PATENT DOCUMENTS

2005/0164727 A1* 7/2005 Hasegawa ............... H04W 4/08
455/519
2015/0050878 A1* 2/2015 Son .................... H04B 7/15507
455/7

FOREIGN PATENT DOCUMENTS

JP 2005-217584 A 8/2005
JP 2005-295196 A 10/2005
(Continued)

*Primary Examiner* — Keith Ferguson
(74) *Attorney, Agent, or Firm* — Muncy, Geissler, Olds & Lowe, P.C.

(57) ABSTRACT

[Problem] To enable group communication with a high degree of freedom in a voice communication system in which a relay device and a terminal device are connected over a communication network.
[Solution] A voice communication system comprises a terminal device and a relay device which transmit and receive a voice signal with each other over a network. The relay device has a group table. The terminal device transmits, to the relay device, specifying information specifying a group to which the terminal device belongs. When receiving the specifying information from the terminal device, the relay device registers the terminal device in the group table, so as to belong to the designated group. The terminal device transmits, to the relay device, a voice signal destined to the group to which the terminal device belongs. When receiving, from the terminal device, the voice signal destined to the belonging group, the relay device transfers the voice signal to another terminal device belonging to the specified group.

6 Claims, 8 Drawing Sheets

(51) Int. Cl.
  *H04B 7/155*   (2006.01)
  *H04W 76/00*   (2018.01)
  *H04W 76/45*   (2018.01)
  *H04W 4/10*   (2009.01)
  *H04W 84/12*   (2009.01)

(52) U.S. Cl.
  CPC ......... *H04W 76/005* (2013.01); *H04W 76/45* (2018.02); *H04W 4/10* (2013.01); *H04W 84/12* (2013.01)

(58) Field of Classification Search
  USPC .................. 455/518, 519, 500, 517, 416, 455/414.1–414.4, 426.1, 426.2, 550.1, 455/509, 450, 445, 456.1–457, 404.1, 455/404.2, 522, 435.1–435.3; 370/252, 370/310, 260, 261
  See application file for complete search history.

(56) References Cited

FOREIGN PATENT DOCUMENTS

| | | |
|---|---|---|
| JP | 2007-151067 A | 6/2007 |
| JP | 2008-511262 A | 4/2008 |
| JP | 2009-527945 A | 7/2009 |
| JP | 2011-508554 A | 3/2011 |

\* cited by examiner

| DESTINATION IP ADDRESS | TRANSMISSION SOURCE IP ADDRESS | DATA BODY | | | | |
|---|---|---|---|---|---|---|
| | | VOICE SIGNAL | COMMUNICATION CONTROLLING INFORMATION | | | |
| | | | CALL TYPE | CALL ID | SENDING ID | USER GROUP NUMBER |

TERMINAL TABLE

| TERMINAL NUMBER | ACTIVE FLAG | SETTING DATA STORAGE ADDRESS |
|---|---|---|
| 1 | ○ | 001 |
| 2 | ○ | 002 |
| ⋮ | ⋮ | ⋮ |
| 100 | × | 100 |

Fig. 6

| CALL TYPE | ID | GROUP TYPE | BELONGING TERMINAL (CALL TARGET TERMINAL) |
|---|---|---|---|
| GROUP | 0010 | NORMAL | 1, 2, 3, 4, 5 |
| GROUP | 0011 | NORMAL | 3, 4, 5, 6, 7 |
| ⋮ | ⋮ | ⋮ | ⋮ |
| GROUP | 1000 | USER | |
| GROUP | 1001 | USER | |

Fig. 7A

| CALL TYPE | ID | GROUP TYPE | BELONGING TERMINAL (CALL TARGET TERMINAL) |
|---|---|---|---|
| GROUP | 0010 | NORMAL | 1, 2, ~~3,~~ 4, 5 |
| GROUP | 0011 | NORMAL | ~~3,~~ 4, 5, ~~6,~~ 7 |
| ⋮ | ⋮ | ⋮ | ⋮ |
| GROUP | 1000 | USER | 3, 6 |
| GROUP | 1001 | USER | |

Fig. 7B

MIXING TABLE

| SESSION NUMBER | CALLING TERMINAL | ADDITIONAL TERMINAL | EXCLUDED TERMINAL | PARTICIPATING TERMINAL | HOLDING TIME (TS) |
|---|---|---|---|---|---|
| 0012 | 9 | - | 9 | 6,7,8,10 | 1500 |
| 0013 | 23 | 23 | 2 | 1,3,4,5,23 | 1500 |
| 19 | 2 | – | – | 2,19 | 1500 |

RELAYING DEVICE, VOICE COMMUNICATION SYSTEM AND VOICE COMMUNICATION METHOD

TECHNICAL FIELD

The present invention relates to a voice communication system using a network such as a wireless LAN.

BACKGROUND ART

Patent Literature 1 proposes an intercom system over a network as a communication system in the premises. In this intercom system, a plurality of terminal devices (slave devices) belong to a group so as to enable simultaneous mutual talk in the group. That is, the plurality of terminal devices connected to an access point (master device) connected to a main control device are grouped into a plurality of groups, and terminal devices in each group perform simultaneous mutual talks, respectively.

In this intercom system, terminal devices belonging to a certain group can change a group to which they belong.

CITATION LIST

Patent Literature

[Patent Literature 1] Japanese Patent Laid-Open No. 2007-151067

SUMMARY OF INVENTION

However, in the system of Patent Literature 1, the group the terminal devices can select is one of the two groups registered in the main control device in advance, and thus a user of each terminal device could not gather freely so as to form a group of arbitrary members.

The present invention has an object to enable group communication with a high degree of freedom in a voice communication system in which a relaying device and a terminal device are connected over a communication network.

A relaying device of the present invention comprises: a network communication unit for communicating with a terminal device over a network; a control unit for controlling the communication with the terminal device; and a storage unit in which a group table is stored. When the control unit receives specifying information specifying a group from the terminal device, the control unit registers the terminal device in the group table so as to belong to the specified group. When the control unit receives a voice signal from the terminal device destined to the belonging group, the control unit transfers the voice signal to another terminal device belonging to the specified group.

A voice communication system of the present invention has a terminal device and a relaying device which transmit and receive a voice signal with each other over a network. The relaying device has a group table. The terminal device transmits specifying information specifying a group to which the terminal device belongs to the relaying device. When the relaying device receives the specifying information from the terminal device, the relaying device registers the terminal device in the group table so as to belong to the specified group. The terminal device transmits the voice signal destined to the group to which the terminal device itself belongs to the relaying device. When the relaying device receives the voice signal destined to the belonging group from the terminal device, the relaying device transfers the voice signal to another terminal device belonging to the specified group.

In a voice communication method of the present invention, a plurality of terminal devices connected over a network transmit/receive a voice signal via a relaying device. The terminal device transmits specifying information specifying a group to which the terminal device itself belongs to the relaying device. When the relaying device receives the specifying information specifying the group from the terminal device, the relaying device registers the terminal device in a group table so as to belong to the specified group. The terminal device transmits the voice signal destined to the belonging group to the relaying device. When the relaying device receives the voice signal destined to the belonging group from the terminal device, the relaying device transfers the voice signal to another terminal device belonging to the specified group.

A program of the present invention causes a control unit of a relaying device communicating with a terminal device over a network to function as means for: when specifying information specifying a group is received from the terminal device, registering the terminal device in a group table so as to belong to the specified group; and when a voice signal destined to the belonging group is received from the terminal device, transferring the voice signal to another terminal device belonging to the specified group.

In the aforementioned invention, the group table stores one or a plurality of user group area in advance and the control unit may transmit, to the terminal device, information of the user group as a group that can be specified.

In the aforementioned invention, the group table sets a normal group to which one or a plurality of terminal devices belong in advance, and when the terminal device belonging to the normal group is made to belong to the user group, the control unit may temporarily delete this terminal device from the normal group.

In the aforementioned invention, the information specifying the group may be added to the voice signal and transmitted from the terminal device to the relaying device.

Advantageous Effect of Invention

According to the present invention, by setting the members of the user group on the basis of the information transmitted from the terminal device, group communication with a higher degree of freedom is enabled.

DETAILED DESCRIPTION OF EMBODIMENT

Figure 1:
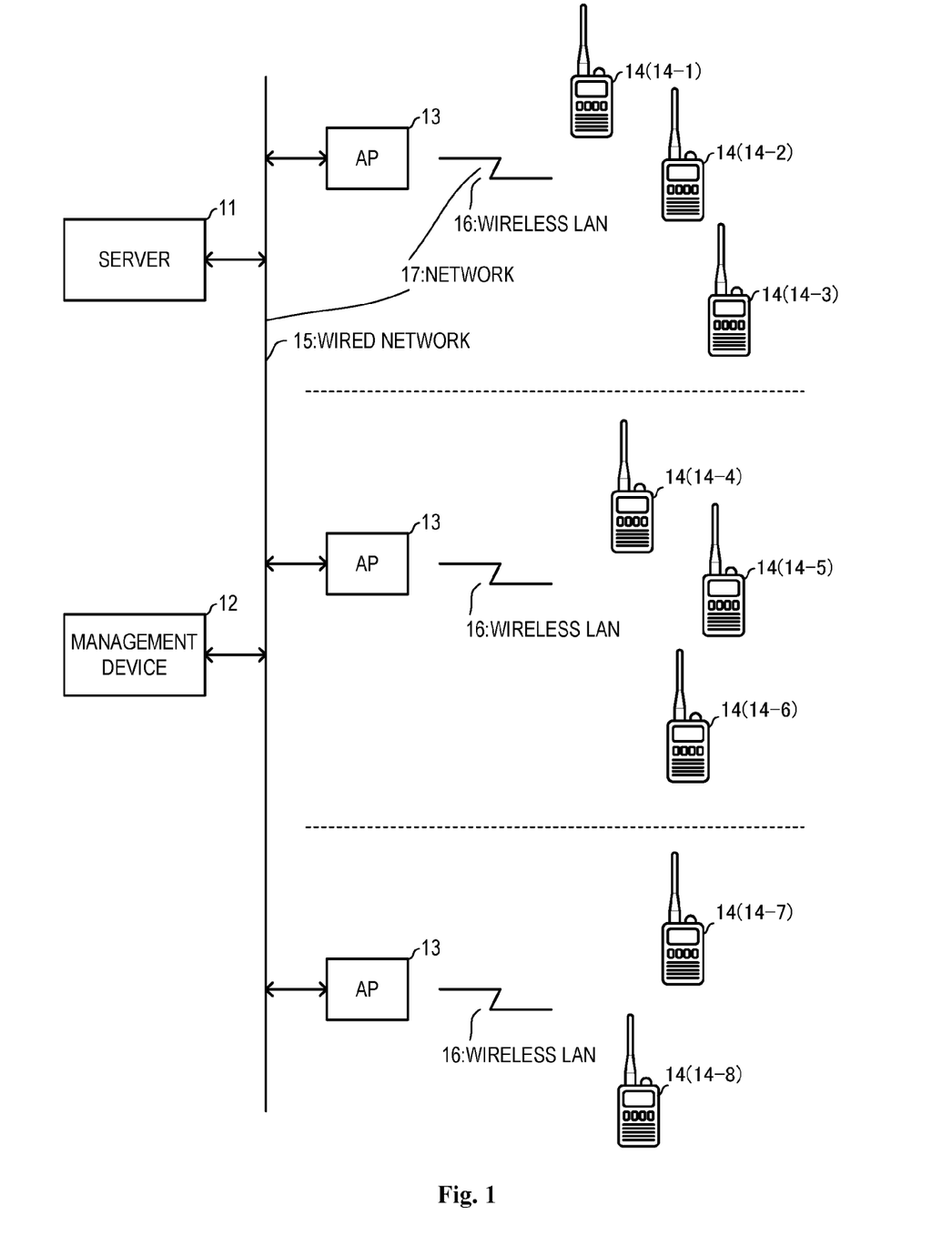
FIG. 1 is a configuration diagram of a voice communication system according to an embodiment of the present invention.
Figure 2:
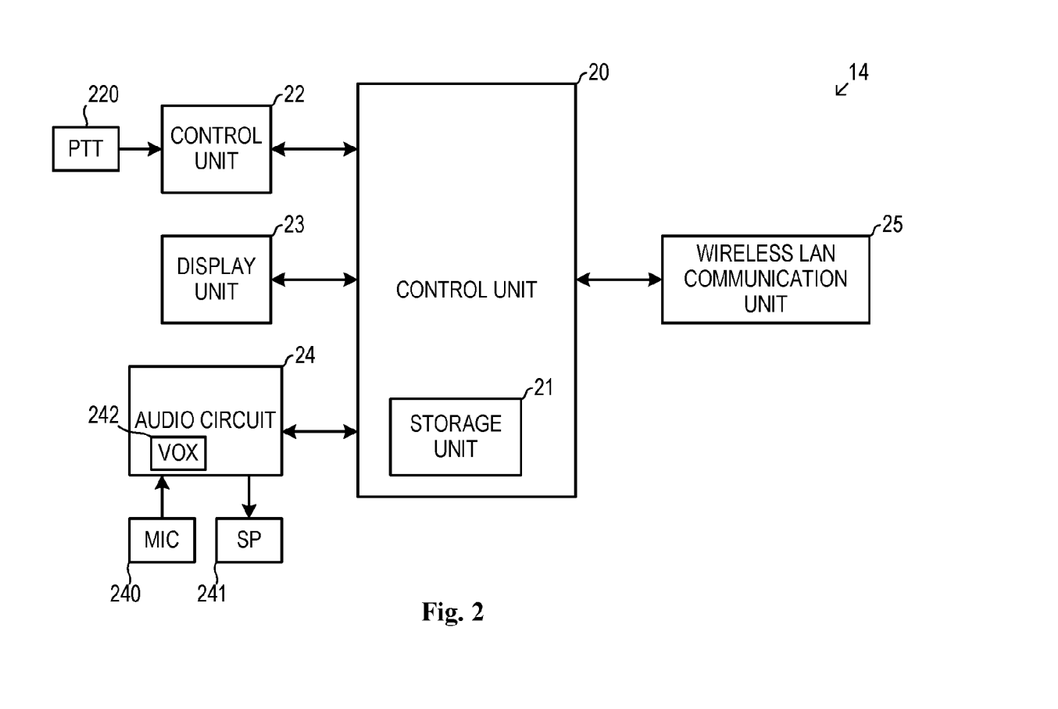
FIG. 2 is a block diagram of a terminal device.

A voice communication system of the present invention will be described with referring to the attached drawings. FIG. 1 is a configuration diagram of the voice communication system according to an embodiment of the present invention. In this voice communication system, a plurality of terminal devices 14 (14-1 to 14-8) communicates with each other by using a wireless LAN (local area network) 16 such as Wi-Fi. The terminal device 14 has a shape resembling a handy transceiver for wireless communication and comprises a PTT (push-to-talk) switch 220 as illustrated in FIG. 2. The terminal device 14 is a wireless network device for transmitting/receiving a voice packet via a wireless access point (AP) 13 in view of a function. A server 11 as a relaying device relays mutual communication of the plurality of terminal devices 14 over a wired network 15 and the wireless LAN 16. Hereinafter, the wired network 15 and the wireless LAN 16 are collectively referred to as a network 17.

As the wired network 15, an Ethernet (registered trademark) LAN and the internet can be used. If the internet is included in the wired network 15, safe communication can be realized by using VPN (virtual private network). Moreover, as the wireless LAN 16, a communication mode conforming to IEEE802.11 such as Wi-Fi can be applied. The terminal device 14 and the wireless access point 13 communicate with each other by this communication mode of the wireless LAN 16. In FIG. 1, three wireless access points 13 are installed, but the number of the wireless access points 13 is not limited in this voice communication system.

The server 11 and the management device 12 are connected to the wired network 15. The server relays communication between the terminal devices. The detail will be described later. The management device 12 is constituted by a personal computer in which a management program is installed or the like. The management device 12 accesses the server 11 in accordance with an operation of an administrator and sets tables and the like as illustrated in FIGS. 6, 7A, 7B and 8 in the server 11. Moreover, the management device 12 also acts as a stationary terminal device and can communicate with mobile terminal devices 14.

Figure 3:
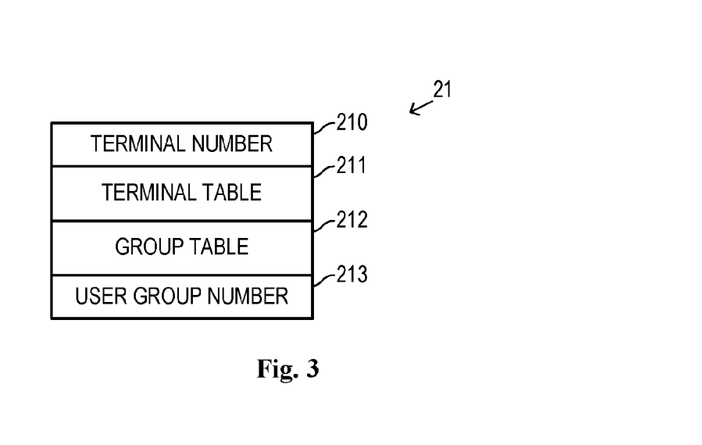
FIG. 3 is a diagram showing a storage area set in a storage unit of the terminal device.

When the terminal device 14 is activated, it is connected to the network 17 via the wireless access point 13 in a communication range. When the terminal device 14 is connected to the network 17, the server 11 performs provisioning with respect to the terminal device 14. The provisioning is processing of registering the terminal device 14 in the server 11 and of providing setting data or a program to the terminal device 14. As a result, the terminal device 14 is set up to a communicable state. The setting data transmitted by the server 11 is a terminal table 211, a group table 212 and the like as shown in FIG. 3, for example. Details of the terminal table 211 and the group table 212 will be described later. At appropriate timing after that, the terminal device 14 requests the server 11 to update the registration. The appropriate timing after that is when the wireless access point 13 in connection is switched or at every certain period of time, for example.

In this voice communication system, the server 11 receives a voice packet (RTP packet) transmitted without a notice from the terminal device 14 and delivers the voice signal of this packet to the terminal device 14 of the communication partner on the basis of communication control information written in this voice packet, whereby a communication establishment procedure such as an SIP procedure is made unnecessary though it is voice communication over the network 17. That is, in this voice communication system, only by turning on the PTT switch 220 of the terminal device 14 and by talking toward the microphone 240, this voice signal is transmitted to the terminal device 14 of the communication partner without any calling operation by a user such as dialing. As a result, the user can perform voice communication over the network with a use feeling similar to that with a transceiver of prior-art wireless communication.

In this voice communication system, communication forms which the terminal device 14 is able to perform are individual communication, group communication, and plenary communication. The individual communication is a one-to-one communication form in which the single terminal device 14 (calling terminal device) performs communication by calling another single terminal device. The group communication is a form in which the terminal device 14 calls a group and performs mutual communication between the terminal devices 14 belonging to the group. The calling of the group communication can be made by the terminal device 14 belonging to the group and also by the terminal device 14 not belonging to the group. If the terminal device 14 not belonging to the group calls group communication, the terminal device 14 which made the calling can participate in the group communication only during a series of communication (communication session) by the calling. This communication form is referred to as expanded group communication below. The plenary communication is group communication targeted to all the terminal devices 14 and is a form in which the calling terminal device 14 calls all, and communication is performed mutually among all the terminal devices 14.

The group as a target of the group communication includes a normal group and a user group, and they are identified by a group number, respectively. Each group is set by the management device 12 in the server 11 and set to each terminal device 14 from the server 11 during provisioning. The normal group is a group for which the belonging terminal devices 14 are fixedly determined in advance. The user group is a group set only as a group and for which the belonging terminal device 14 is not determined (no terminal device in an initial state). The terminal device 14 belongs to a user group selected by a user by an operation of the user. The operation of the user is transmitted from the terminal device 14 to the server 11, and when the server 11 receives that, the server 11 causes the terminal device 14 to belong to the selected user group. If the terminal device 14 belongs to the normal group, the server 11 temporarily excludes the terminal device 14 from the group. When a plurality of the terminal devices 14 belong to the same user group by the operation of the user, communication can be performed among members of the group (temporarily) organized by the user. The user can disaffiliate the terminal device 14 from the user group by substantially the same operation as the selecting operation of the user group.

FIG. 2 is a block diagram of the terminal device 14. As described above, the terminal device 14 is a wireless network device for transmitting/receiving a voice packet via the wireless access point (AP) 13 of the wireless LAN in terms of functions. The control unit 20 is configured by a microprocessor and controls an operation of the terminal device 14. The control unit 20 has a storage unit 21 storing data shown in FIG. 3. To the control unit 20, an operation unit 22, a display unit 23, an audio circuit 24, and a wireless LAN communication unit 25 are connected. The operation unit 22 includes a key switch such as the PTT switch 220 so that the operation unit 22 receives the operation of the user and inputs its operation signal to the control unit 20. The display unit 23 includes a liquid crystal display. The liquid crystal display displays the identification number of the communication partner selected by the user's operation, the identification number of the incoming communication partner and the like.

The audio circuit 24 has the microphone 240 and a speaker 241. The control unit 20 decodes a voice signal retrieved from the received voice packet and inputs it to the audio circuit 24. The audio circuit converts this decoded voice signal to an analog signal and outputs it from the speaker 241. Also, the audio circuit 24 converts the voice signal input from the microphone 240 to a digital signal and inputs it to the control unit 20. The control unit 20 makes this digital voice signal to a voice packet and inputs it to the wireless LAN communication unit 25. The wireless LAN communication unit 25 has a circuit performing wireless communication in the communication method in compliance with IEEE802.11. The wireless LAN communication unit 25 transmits the packet input from the control unit 20 to the wireless access point 13. With these functions, when the user utters voice toward the microphone 240 while pressing on the PTT switch 220, this voice signal is edited to a voice packet and transmitted toward the server 11. In addition, the wireless LAN communication unit 25 inputs the packet, received from the server 11 via the wireless access point 13, into the control unit 20.

The terminal device 14 has a VOX circuit 242 together with the PTT switch 220. The VOX circuit 242 is a circuit which determines whether or not a talking voice of a user (voice signal) has been input on the basis of an input level of the microphone 240 and its holding time and switches the device to a transmission state similar to a state in which the PTT switch 220 is turned on if it is determined that the talking voice has been input. The terminal device 14 switches transmission on/off by the mode setting based on one or both of turning on of the PTT switch 220 and the VOX circuit 242.

A general wireless communication transceiver is based on a simplex mode which cannot receive a wireless signal in a transmission state, whilst the terminal device 14 can perform communication in a full duplex mode in which transmission and reception of the voice signal is performed in parallel at the same time. This function is based on the fact that the terminal device 14 is a network communication terminal transmitting/receiving the voice packet at high speed over the network 17. However, even if full-duplex communication is performed, the terminal device 14 edits and transmits the voice packet only when the talking voice is input by the function of the PTT switch 220 or the VOX circuit 242 so that a voiceless voice packet is not continuously transmitted.

When the terminal device 14 is provisioned by the server 11, items shown in FIG. 3 is written in the storage unit 21. The terminal number 210 is identification information of this terminal device 14 and is expressed by a numerical value in one to plural digits. The terminal table 211 is a table in which the terminal numbers of the other terminal devices 14 are described. The group table 212 is a table in which group numbers of groups set in the voice communication system are described. This terminal device 14 is communicable with the terminal device 14 and the group described in the terminal table 211 and the group table 212. In the group table 212, the number of the user group to which this terminal device 14 can belong is also described. Moreover, the user group number 213 is a number of the user group to which this terminal device 14 temporarily belongs. The user group number 213 is "0" in the initial state meaning that the terminal device does not belong to the user group. After that, if one user group described in the group table 212 is selected by the operation of the user of this terminal device 14, that number is written in an entry of this user group number 213, and this terminal device 14 belongs to the user group.

Figure 4:
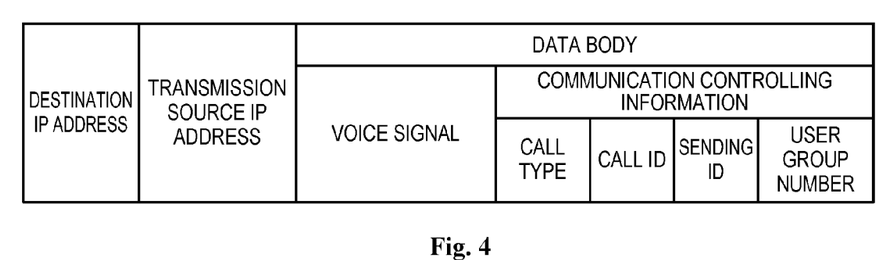
FIG. 4 is a diagram illustrating an example of configuration of a voice packet.

The voice packet has configuration as shown in FIG. 4. The voice packet consists of a header and a data body (payload). The header includes a destination IP address (destination address) and a transmission source address (sender address). In the case of the voice packet transmitted from the terminal device 14 to the server 11, the destination IP address is an IP address of the server 11, and the transmission source address is an IP address of the terminal device 14. On the other hand, in the case of the voice packet transmitted from the server 11 to the terminal device 14, the destination IP address is the IP address of the terminal device 14, and the transmission source address is the IP address of the server 11. The data body includes communication control information together with the digitized voice signal. The communication control information includes a call type, a call ID, a sending ID and the user group number. The call type is information identifying the communication type (individual communication, group communication, plenary communication) of the voice packet. The call ID is information identifying a communication partner (target device), and in the case of the individual communication, the terminal number of the terminal device 14 is used, while in the case of the group communication, the group number of the group is used.

The sending ID is information indicating a sender of the voice signal. In the case of the voice packet transmitted from the terminal device 14 to the server 11, the terminal number of the terminal device 14 is written in the sending ID. The voice signal made into a voice packet and transmitted from the terminal device 14 is re-placed on another voice packet in the server 11 and is transferred to the terminal device 14 of the communication partner. In the terminal device 14 of the communication partner, too, the terminal ID of the terminal device 14 having transmitted the voice signal is written in the sending ID of the voice packet transferred from the server 11 to the terminal device 14 so that the sender of the received voice signal is known. In the case of the group communication, a signal obtained by mixing the voice signals received from a plurality of the terminal devices 14 is packetized and transferred to the terminal device 14 in some cases, but the sending ID of this voice packet may be cleared, and the group number may be written.

In case of the group communication, voice signals received from a plurality of the terminal devices 14 participating in the group communication are mixed and transferred to each terminal device 14 participating in the group communication. The mixing is performed separately for each of the terminal devices 14 so as not to return the voice signal transmitted by a certain terminal device 14 to itself. That is, all the received voice signals are mixed and transferred to the terminal device 14 not transmitting the voice signal, while the voice signal transmitted by a certain terminal device 14 is removed and the voice signals other than that are mixed and transferred to the certain terminal device 14. As a result, an echo of the voice signal transmitted by its own device is not generated in the terminal device 14.

In the case of performing the group communication, configuration of the terminal device 14 belonging to the group is not fixed but is flexibly increased/decreased in accordance with the situation of the communication of each of the terminal devices 14 at that time. Details will be described with referring to the table in FIG. 6.

Figure 5:
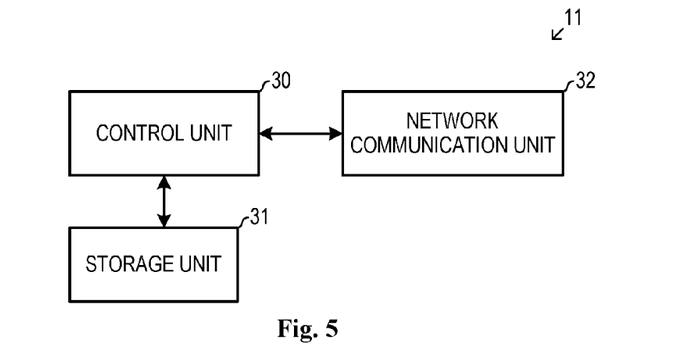
FIG. 5 is a block diagram of a server.

FIG. 5 is a block diagram of the server 11. The server 11 has a control unit 30, a storage unit 31, and a network communication unit 32. The storage unit 31 is constituted by a hard disk, a RAM and the like, for example, and stores various tables illustrated in FIGS. 6 to 8, setting data of each of the terminal devices 14 and the like. The control unit 30 performs setup of the terminal device 14 and mixing of the voice signals. The network communication unit 32 controls communication with the wired network 15.

FIGS. 6, 7A, 7B, and 8 are diagrams illustrating tables provided in the storage unit 31 of the server 11.

Figure 6:
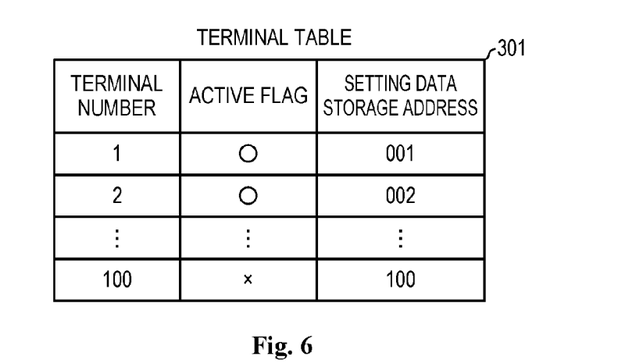
FIG. 6 is a diagram illustrating a terminal table set for the server.

FIG. 6 is a diagram illustrating the terminal table 301. The terminal table 301 is a table for managing the terminal devices 14 by the server 11. Each terminal device 14 is identified with a terminal number, which is an identification number uniquely assigned to respective terminal device 14. The terminal table 301 stores an active flag and a storage address of setting data for each of the terminal numbers. The active flag is a flag indicating that the terminal device 14 has been connected to the network 17, has accessed to the server 11 and completed the provisioning by the server 11 so that a communication is available. The setting data includes an update data (firmware) of the program, the group to which the device itself belongs, a directory recording other groups for which communication is allowed and the like, for example.

When the terminal device 14 is connected to the network 17, the server 11 communicates with the terminal device 14 and performs the provisioning processing with respect to the terminal device 14, and after the completion of that processing, the server 11 sets an active flag on the terminal table 301 and makes registration in which the terminal device 14 is registered to be able to communicate. Furthermore, at appropriate timing after that, the server 11 communicates with the terminal device 14 and updates the registration of the terminal device 14. The appropriate timing after that is when the wireless access point 13 in connection is switched or at every certain period of time, for example.

Figure 7A:
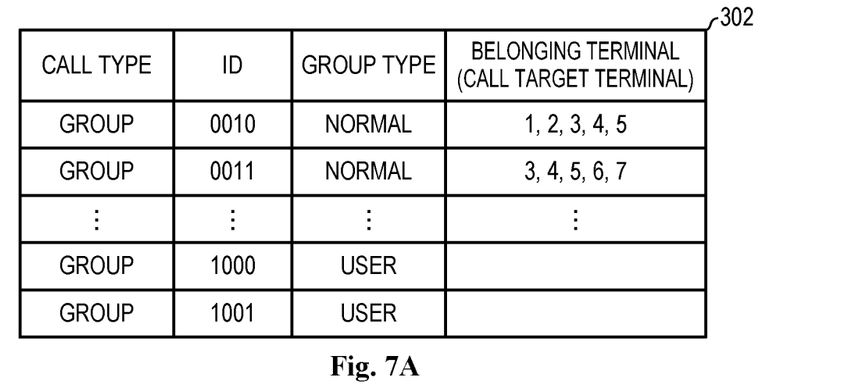
FIG. 7A is a diagram illustrating a group table set for the server.
Figure 7B:
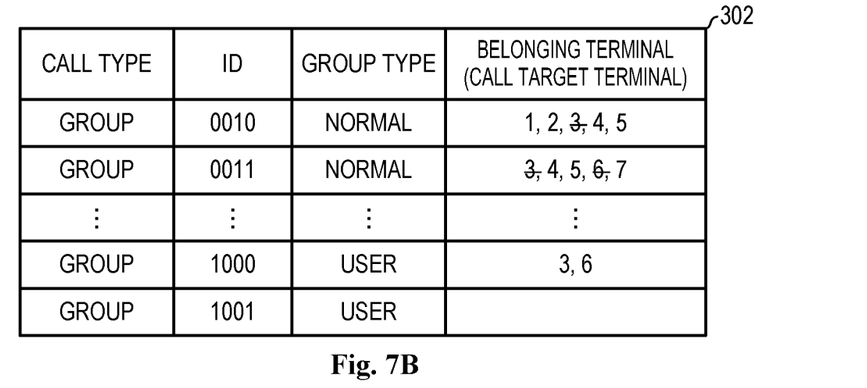
FIG. 7B is a diagram illustrating the group table set for the server.

FIGS. 7A and 7B are diagrams showing the group table 302. The group table 302 is a table for the server 11 to manage the groups. FIG. 7A shows the group table 302 in the initial state, and FIG. 7B shows the group table 302 in a state where the user group is in use. The groups are identified by IDs (group numbers) uniquely assigned to each of the groups. In the group table 302, the group number, a group type, and the terminal number of the terminal device 14 belonging to the group (belonging terminal device) are stored for each group. The group type is the normal group or the user group. The normal group is a group for which the belonging terminals are determined in advance. The user group is a group in which the belonging terminal is registered in accordance with the user group information received from the terminal device 14. In this embodiment, two user groups, that is, the user groups 1000 and 1001 are set. In FIG. 7A, no terminal device 14 is registered in the user group. In FIG. 7B, the third terminal device 14-3 and the sixth terminal device 14-6 are registered in the user group 1000. Instead of this registration, registration of the terminal devices 14-3 and 14-6 in the normal groups 0010 and 0011 is temporarily deleted. As a result, the users of the terminal devices 14-3 and 14-6 having moved to the user group 1000 can perform communication only with the terminal devices 14-3 and 14-6 without being interfered with another communication. The number of the terminal devices 14 registered in the user group is not limited to 2. Moreover, the terminal device 14 registered in the user group does not have to be temporarily deleted from the normal group.

The server 11 transmits all of or some of the terminal numbers described in the terminal table 301 and all of or some of the group numbers described in the group table 302 to the terminal device 14 in provisioning. The terminal number and the group number to be transmitted to each of the terminal devices 14 are described in setting data (see the terminal table 301 and the group table 302) for each of the terminal devices 14.

Figure 8:
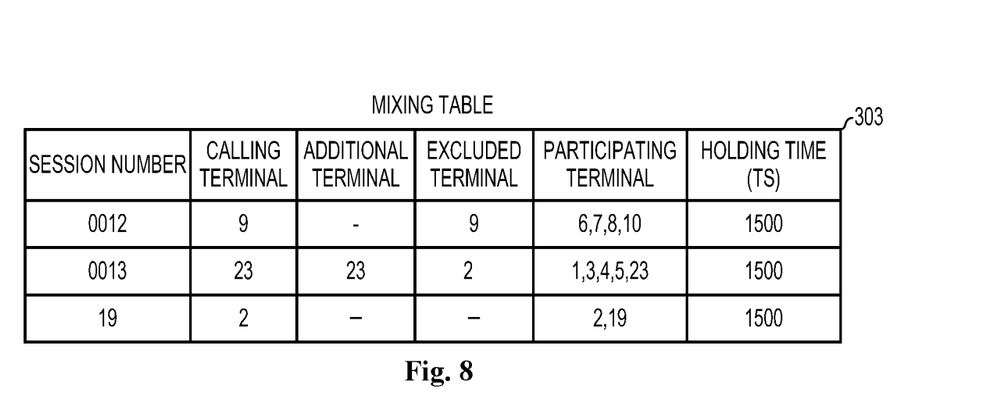
FIG. 8 is a diagram illustrating a mixing table set for the server.

FIG. 8 is a diagram illustrating mixing tables (session tables) 303. The mixing tables 303 are tables for the server 11 to manage a communication session. The communication session is a communication state between a plurality of the terminal devices 14 using the server 11 as a relaying device. The mixing tables 303 have a plurality of lines, and information of one communication session is stored in each line. When the server 11 receives a voice signal (voice packet) from the terminal device 14, the server 11 determines from which communication session the voice signal is received with referring the mixing tables 303.

When the server 11 receives a calling voice packet, which is the first voice packet from the terminal device 14, a communication session based on this voice packet is registered in the mixing table 303.

The mixing table 303 is provided with the following entries for each communication session: a session number, a calling terminal number, a participating terminal number, an additional terminal number, an excluded terminal number, and remaining holding time (T1). The session number is a number for identifying this communication session. The calling terminal number is the terminal number of the terminal device 14 (calling terminal device) which transmitted a first voice packet (calling voice packet) of this communication session. The session number may be any number as long as it has a unique value for each communication session, and in this embodiment, an identification number of a communication partner written in the calling voice packet is used. The communication session in which the terminal number ("19", for example) is registered as the session number is the communication session of the individual communication. The individual communication is communication between individual terminal devices 14 in a one-to-one manner. The communication session in which a group number is registered as the session number ("0012", for example) is a communication session of the group communication. The group communication is communication in which the plurality of terminal devices 14 (3 units or more in general) mutually exchange voice signals.

The participating terminal numbers are a list of the terminal numbers of the terminal devices 14 participating in this communication session. When a voice packet is transmitted from a certain terminal device 14 whose terminal number is registered as the participating terminal number, the control unit 30 transfers this voice packet to another terminal device 14 whose terminal number is registered as the participating terminal number and realizes mutual communication between the participating terminal devices.

In the case of the group communication session, the participating terminal number is the terminal number of the calling terminal device and the terminal number of the terminal device 14 belonging to the group specified by the communication partner. However, the terminal device 14 belonging to that group but not active or the terminal device 14 performing another individual communication session cannot participate in this group communication session and thus, the terminal numbers of those terminal devices 14 are excluded from the participating terminal numbers (registered in the area of the excluded terminal number). Note that, since the terminal numbers of the terminal devices 14 temporarily deleted from the group are moved to the user group, they are not handled as the belonging terminals to the group and are not described in the entry of the excluded terminal number in the group communication session.

If the calling terminal device is the terminal device 14 not belonging to this group, that is, if the terminal device 14 calls the group other than the group it belongs to (expanded group communication), the terminal number of the terminal device 14 is also registered as the participating terminal number. At the same time, the terminal number is also registered in an area of an additional terminal number as an additional terminal device provisionally registered as a member. That is, in this group communication session, the calling terminal device is handled as the terminal device 14 (participating terminal device) participating in that communication session similarly to the terminal device 14 belonging to the group, even if it does not belong to the group. Note that, among the entries in the mixing table 303, the area for the additional terminal number and the excluded terminal number are not indispensable. The table can be managed only with addition and exclusion of the terminal numbers with respect to the area of the participating terminal number.

In the case of the individual communication session, the terminal number of the calling terminal device and the terminal number of the terminal device 14 of the communication partner are registered as the participating terminal number. Since it is one-to-one communication, the additional terminal number and the excluded terminal number are not registered.

Also, the holding time is time for holding this communication session without cancelling it in a state in which the voice packet is not transmitted from the participating terminal device. The holding time of each communication session in the server 11 is set to 30 seconds, for example. A holding time timer (TS) of the mixing table 303 is a timer for counting elapse of the holding time when the voice packet is not transmitted. The holding time timer TS is counted down if the voice packet is not transmitted in processing by means of the control unit 30 (see FIG. 12) and is reset to 30 seconds if the voice packet is transmitted. If the timer TS is timed up since the voice packet is not sent from the participating terminal device for 30 seconds, this communication session is canceled, and information of this communication session is erased from the mixing table.

In the aforementioned example, in the group communication session, the calling terminal device other than the belonging terminal devices is additionally registered in the entry of the participating terminal device in the mixing table 303, and the terminal device 14 which is non-active and the terminal device 14 performing another communication session are excluded even though it is the belonging terminal device. However, the terminal device 14 additionally registered in the entry of the participating terminal device and the excluded terminal device 14 are not limited to the above.

If a certain participating terminal device starts another communication session (individual communication session) in the middle of the group communication session, the participating terminal device is excluded at that time from the participating terminal devices of the group talk session. That is, the terminal number of the terminal device 14 is moved from the area of the participating terminal number to the area of the excluded terminal number.

In addition, in order for the communication session to be continued, the holding time needs to be counted also in each of the terminal devices 14. Holding time (T1) of the terminal device 14 is set to 5 seconds in the present embodiment, which is shorter than the holding time (TS=30 seconds) of the server 11. The user can start another communication session by a predetermined operation when 5 seconds elapse after the PTT switch 220 is turned off, even if the communication session is maintained in the server 11. The holding time (T1) of the terminal device 14 can also be set to 30 seconds or more.

Moreover, the mixing table 303 may be divided into two tables, that is, an executing mixing table and a retreat table. The executing mixing table is a table in which the session currently performing mixing is registered and is formed on a high-speed memory. The session in which the communication (transmission/reception of a voice signal) discontinues is transferred to the retreat table in a short time such as approximately 200 milliseconds and held only for the holding time (T1) in the retreat table. If communication (transmission/reception of the voice signal) occurs again during the holding time, the session is transferred to the executing mixing table again and is used for execution of mixing. As a result, each of the terminal devices 14 can be released from the mixing table 303 earlier.

Figure 9:
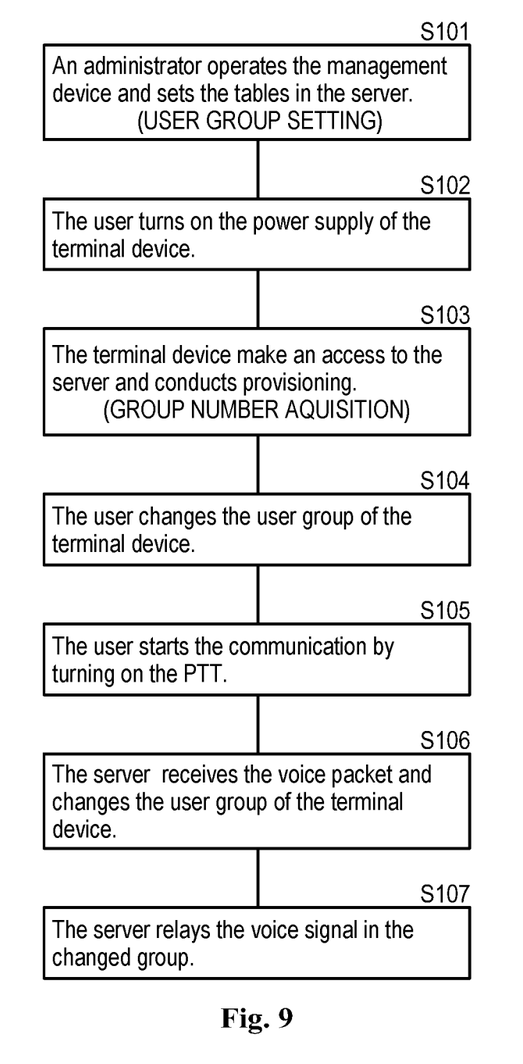
FIG. 9 is a diagram showing a procedure when user group communication is performed.

With referring to FIG. 9, a procedure in which the communication session of the user group in this voice communication system is formed will be described. First, an administrator of the system operates the management device 12 and sets the terminal table 301 and the group table 302 in the server 11 (S101). At this time, the user group is also set in the group table 302. After that, when the user turns on the power supply of the terminal device 14 (S102), the terminal device 14 makes an access to the server 11, and the server 11 performs the provisioning processing with respect to this terminal device 14 (S103). By this processing, the terminal device 14 obtains the group number including the user group and enters a communicable state. The user operates the terminal device 14 activated by the aforementioned processing and changes the group (S104). That is, the user selects a menu of user group change and selects the number of the desired user group using a dial. As a result, the user group to which the terminal device 14 belongs is changed. That is, the user group number 213 stored in the storage unit 21 of the terminal device 14 is changed. The user group to which the terminal device 14 belongs is "0 (no belonging)" in the initial state. Before the operation at S104, the user (terminal device 14) may perform the group communication of the normal group or individual communication. The user starts the communication by turning on the PTT switch 220 of the terminal device 14 whose user group was changed (S105). By turning on the PTT switch 220, the terminal device 14 edits the voice packet shown in FIG. 4 and transmits it to the server 11. The server 11 updates the group table 302 on the basis of the user group number of the voice packet received from the terminal device 14 (S106). If the user group number of the terminal device 14 has been changed, the belonging terminal is registered in the user group as shown in FIG. 7(B) by this processing. After that, the server 11 processes the communication session of the user group to which the belonging terminal is registered and relays the voice signal (S107).

When the user changes the user group of the terminal device 14, the user can transmit a short voice packet by pressing the PTT switch 220 shortly and can register only the change of the user group in the server 11 without actual communication. Even if no operation is performed after the change of the user group, the terminal device 14 performs update processing of the registration with the server 11 at the aforementioned predetermined timing and thus, the change of the user group is registered at this time in the server 11.

Figure 10:
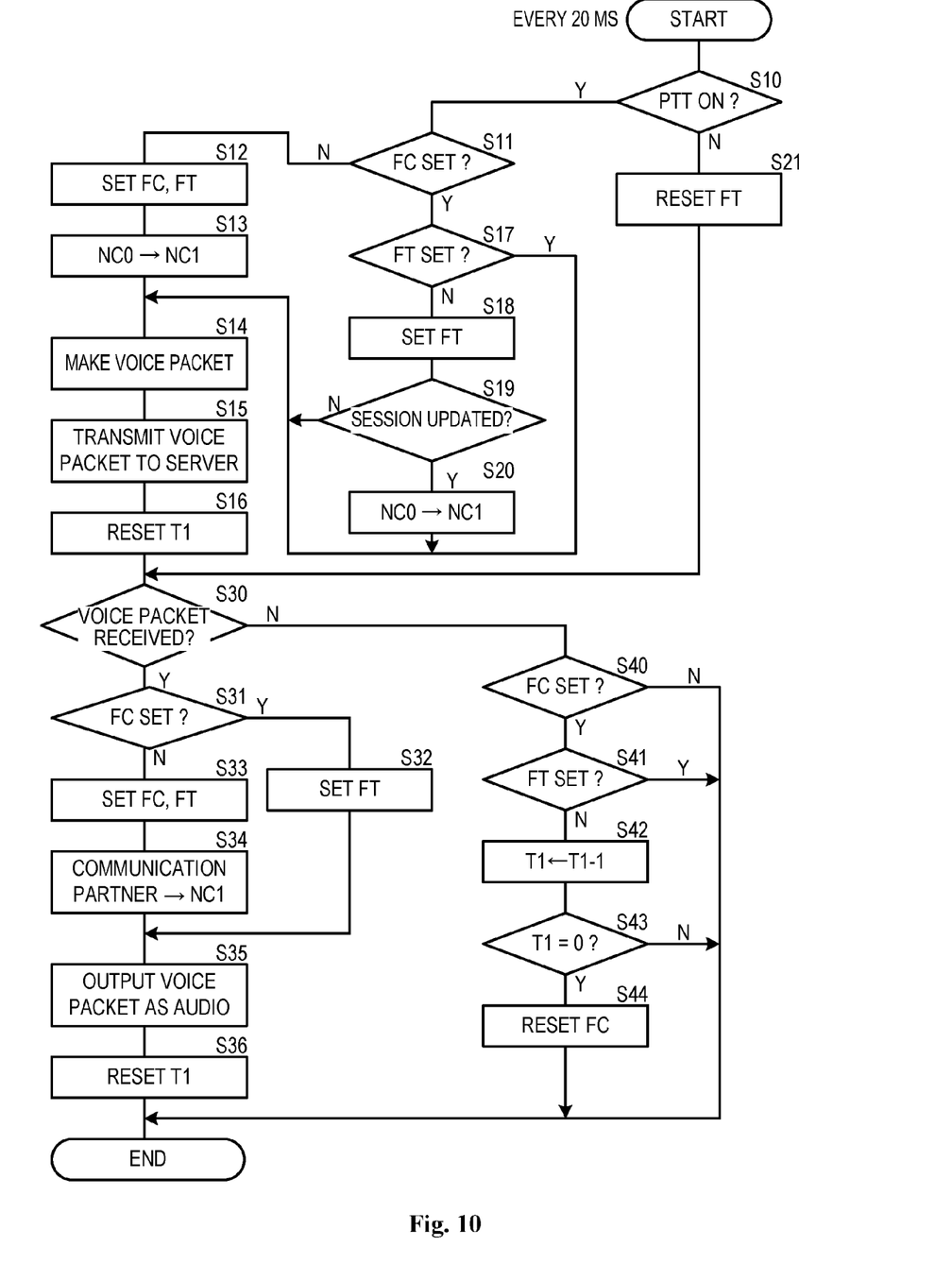
FIG. 10 is a flowchart illustrating an operation of the terminal device.

FIG. 10 is a flowchart illustrating a communication control processing performed by the control unit 20 of the terminal device 14. This processing is performed repeatedly every 20 milliseconds. In this processing operation, the current communication state (status) is deduced in accordance with on/off of the PTT switch 220 or reception of a voice packet (RTP packet). Here, flags and timers used in the flowcharts are as follows.

PTT: This is abbreviation of the push-to-talk switch (PTT switch) 220 but is not limited to on/off of the PTT switch 220 but also includes on/off of a transmitted signal by the VOX circuit.

NC0: Written into a communication-partner identification number (terminal number/group number) selected by the user's operation and a first voice packet for which the communication session is established (a calling voice packet) so as to become a session number (NC1).

NC1: A session number (a call ID), and a number for identifying a communication session being performed.

FC: A communication session flag (flag indicating that this terminal device 14 participates in the communication session).

FT: An in-communication flag (flag indicating during transmission or during reception of a voice packet).

T1: A holding time timer (timer counting holding time (5 seconds) of a communication session).

S10 to S21 are transmission management processing of a voice packet. The control unit 20 determines the state of the PTT switch 220 (S10). If the PTT switch 220 is on, the control unit 20 proceeds the processing to S11. If the PTT switch 220 is not on, it proceeds the processing to S21.

At S11, the control unit 20 determines whether or not the communication session flag FC is set. If the communication session flag FC is not set (NO at S11), the voice packet created by turning-on of the PTT switch 220 this time is a calling voice packet. The control unit 20 sets the communication session flag FC and the in-communication flag FT indicating that the voice packet is being transmitted/received (S12). The control unit 20 transfers the communication partner number NC0 selected by the user to the communication session number NC1 (S13), makes a voice packet to which that communication session number NC1 and the user group number stored in the entry of the user group 213 are written (S14), and transmits the voice packet to the server 11 (S15). By the transmission of this calling voice packet, the communication session is started by the server 11. The control unit 20 resets the holding time timer T1 to 5 seconds (S16) and then, proceeds the processing to reception management processing of the voice packet at S30 and after.

If the communication session flag FC has been already set at S11 (YES at S11), the control unit 20 determines whether the in-communication flag FT is set or not, that is, whether the voice packet is being transmitted or received (S17). If the in-communication flag FT is not set (NO at S17), the control unit 20 sets the in-communication flag FT (S18). The processing proceeds as S11→S17→S18 if transmission of a new voice packet (user's talking voice) is started in a state in which the communication session which has been already started is maintained. At S19, the communication session which has been already started is continued, and it is determined whether a voice packet this time is replied to the communication session (NO at S19) or the previous communication session is exited and the voice packet this time is transmitted to a new communication partner, that is, an another new communication session is established (YES at S19). This determination may be made on the basis of whether an operation by the user immediately before the PTT switch 220 is turned on this time, a selection operation of the communication partner or the like has been performed or not, for example. If the selection operation of the new communication partner has been performed by the user, it is only necessary to perform processing of establishing a new communication session to the communication partner selected in the processing at S20.

When the communication session is to be updated (YES at S19), the control unit 20 transfers the communication partner number NC0 selected at that time to the communication session number NC1 (S20) and proceeds the processing to S14. If the communication session which has been already started is to be continued (NO at S19), the control unit 20 proceeds the processing from S19 to S14 as it is.

At S10, if the PTT switch 220 is not turned on (NO at S10), the control unit 20 resets the in-communication flag FT (S21). If the in-communication flag FT has been already reset, it may be left as it is. After that, the control unit 20 proceeds the processing to the reception management processing of the voice packet at S30 and after.

The control unit 20 determines at S30 whether or not the voice packet has been received over the network 17. If the control unit 20 has received the voice packet, it proceeds the processing to S31. If the voice packet has not been received, the processing is proceeded to S40.

At S31, the control unit 20 determines whether the communication session flag FC has been set or not. If the communication session flag FC has not been set (NO at S31), it is determined that a new communication session is established this time, and its first voice packet is transmitted and then, the communication session flag FC and the in-communication flag FT are set (S33). The FT flag is a flag indicating that the voice packet is currently being transmitted/received. The control unit 20 transfers the communication-partner number included in the voice packet to the communication session number NC1 (S34). The control unit 20 outputs the voice packet to the audio circuit 24 (S35) and resets the holding time timer T1 to 5 seconds (S36).

If the communication session flag FC has been already set at S31 (YES at S31), the control unit 20 sets the in-communication flag FT in correspondence with reception of the voice packet this time (S32). Note that, if the in-communication flag FT has been already set, it may be left as it is. After that, the control unit 20 proceeds the processing to S35.

If the voice packet has not been received at S30 (NO at S30), the control unit 20 determines whether or not the communication session flag FC has been set (S40). If the communication session flag FC is set (YES at S40), the control unit 20 performs the processing at S41 and after. If the communication session flag FC is not set (NO at S40), the control unit 20 finishes the processing as it is.

The control unit 20 determines at S41 whether or not the in-communication flag FT is set. If the in-communication flag FT is set (YES at S41), the control unit 20 finishes the processing as it is. If the in-communication flag FT is not set (NO at S41), that is, in a state in which the in-communication flag FT is reset but the communication session flag FC is set, the control unit 20 subtracts the holding time timer T1 by 1 count (20 milliseconds) (S42). Then, it is determined whether the holding time timer T1 has become 0 or not by this subtraction (S43). If the holding time timer T1 has become 0 (YES at S43), the control unit 20 resets the communication session flag FC in order to cancel the communication session (S44). If the holding time timer T1 is still larger than 0 at S43 (NO at S43), the control unit 20 finishes the processing as it is.

Figure 11:
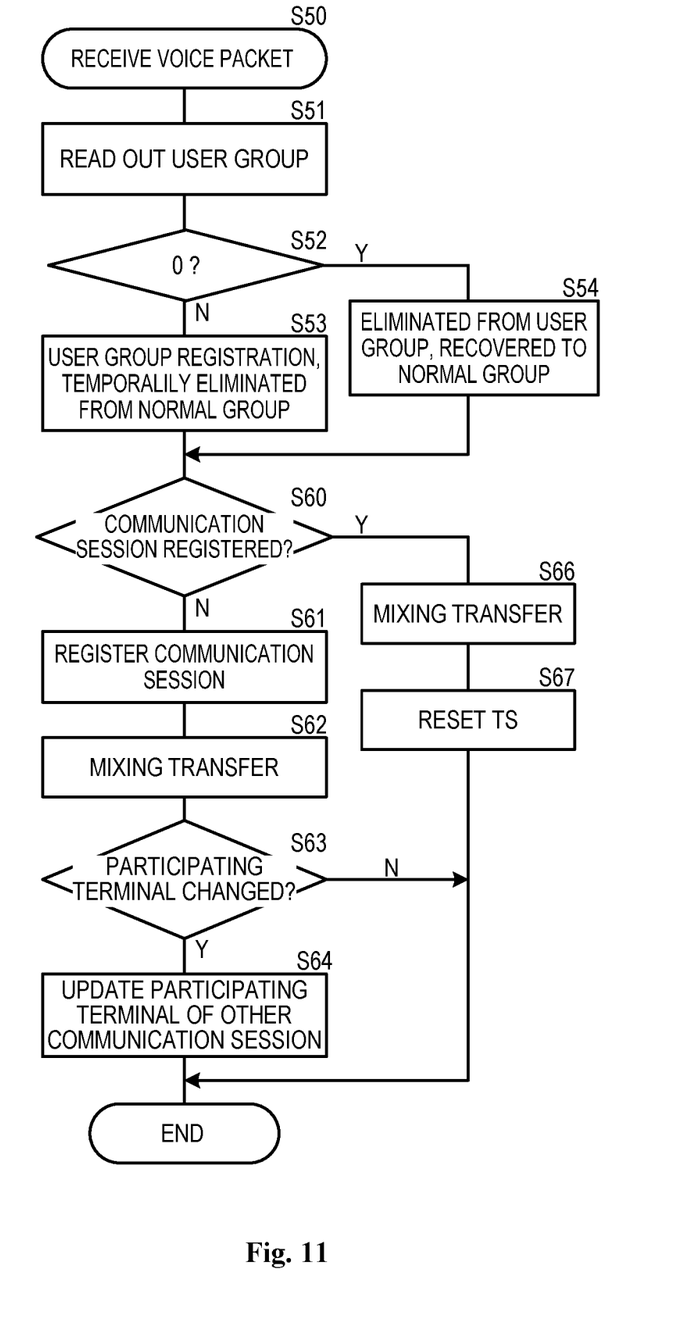
FIG. 11 is a flowchart illustrating an operation of the server.
Figure 12:
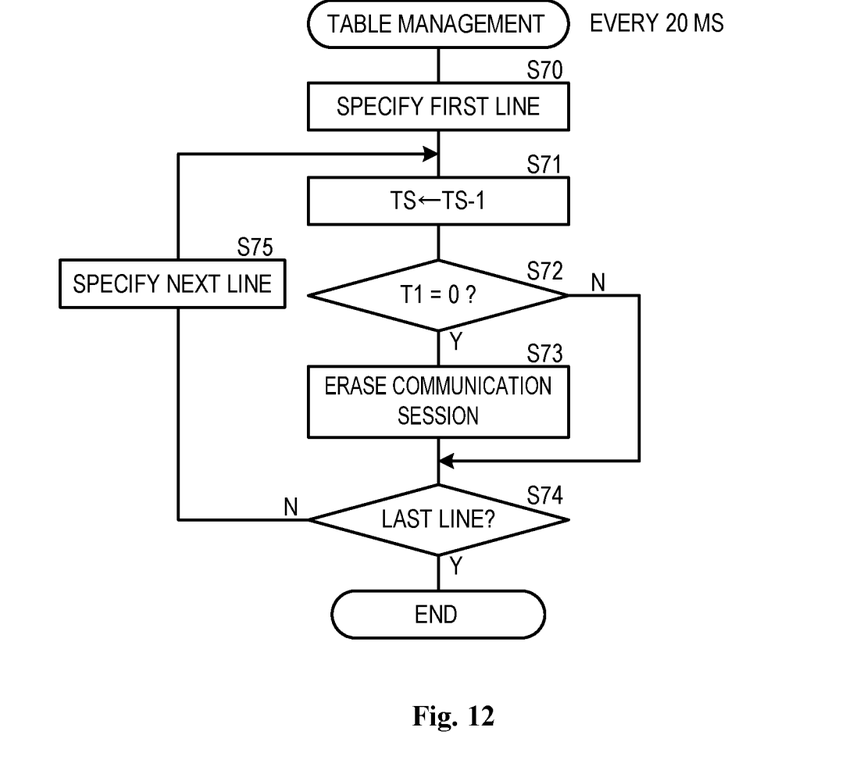
FIG. 12 is a flowchart illustrating the operation of the server.

FIGS. 11 and 12 are flowcharts illustrating an operation of the server 11. FIG. 11 illustrates processing when the voice packet is received. FIG. 12 illustrates a mixing-table management processing.

In FIG. 11, when the control unit 30 receives the voice packet from the terminal device 14 (S50), the control unit 30 reads out the user group number set in the terminal device 14 from the voice packet (S51). If the read-out user group number is not "0" (NO at S52), the terminal number of this terminal device 14 is registered in the entry of the read-out user group number in the group table 302, and the terminal number of this terminal device 14 is temporarily deleted from the normal group to which this terminal device 14 belongs (S53). On the other hand, if the read-out user group number is "0" (YES at S52), the terminal number of this terminal device 14 is deleted from the entry of the user group in the group table 302, the temporary deletion from the normal group is cancelled, and recovery of the terminal device to the normal group is performed (S54). The processing at S53 and S54 needs to be performed only when the user group number written in the voice packet is changed.

It is determined whether the communication session identified by the sender terminal number and the communication partner number has been already registered in the mixing table 303 (S60). If the communication session has been already registered in the mixing table 303 (YES at S60), the control unit 30 transfers the voice signal contained in the received voice packet to the terminal device 14 participating in the communication session on the basis of the participating terminal number of the mixing table 303 (S66). Then, the holding time timer TS of the communication session of the mixing table 303 is reset to 30 seconds (S67).

If the communication session of the received voice packet is not registered in the mixing table 303 (NO at S60), that is, if this voice packet is a calling voice packet, a new communication session based on this calling voice packet is registered in the mixing table 303 (S61). At that time, the communication-partner number is registered as a session number, and the terminal number of the terminal device 14 which is the transmission source of this voice packet is registered as the calling terminal number. As the participating terminal number, in the case of the individual communication session, the communication partner number and the calling terminal number are registered, and in the case of the group communication session, the calling terminal number and the terminal number of the terminal device 14 belonging to the group of the communication partner number are registered. If the calling terminal device does not belong to a group, the calling terminal number is registered also in the additional terminal number. Moreover, if there is a terminal device that cannot participate in this communication session since it is inactive or participating in another communication session or the like in the terminal devices 14 belonging to the group, its terminal number is excluded from the entry of the participating terminal number and is transferred to the entry of the excluded terminal number.

The control unit 30 transfers the voice signal of the received voice packet to the terminal device 14 participating in that communication session (S62). The terminal device 14 participating in that communication session is determined from the participating terminal number of the communication session registered in the mixing table 303.

The control unit 30 determines whether there is a device to be excluded from the participating terminal devices of the communication session already registered due to its participation in the communication session established in S61 (S63). If such a terminal device 14 is present (YES at S63), the terminal number of this terminal device 14 is deleted from the participating terminal number of the previously established communication session (S64). The excluded terminal number is transferred to of the excluded terminal number. The participating terminal device of each communication session is optimized as above.

The mixing table management processing in FIG. 12 is repeatedly performed regularly (every 20 milliseconds, for example). The control unit 30 first specifies a communication session on the first line of the mixing table 303 (S70). The control unit 30 subtracts the holding time timer TS of the specified communication session by 1 count (20 milliseconds) (S71) and determines whether or not the holding time timer TS has become 0 by this subtraction (S72). If the holding time timer TS has become 0 (YES at S72), the control unit 30 considers that this communication session is finished and erases the communication session on this line (S73).

The control unit 30 manages the mixing table 303 by sequentially performing the aforementioned processing to the last line of the mixing table 303 (S74, S75).

If the terminal device 14 moves to the user group in the middle of the communication session of the normal group, the terminal device 14 may be excluded from the communication session of the normal group. If the terminal device having been moved to the user group returns to the normal group in the middle of the communication session of the normal group, the terminal device may participate in the session of the normal group communication from the middle of it. Similarly, if the terminal device 14 moves to another group (normal group, another user group) in the middle of the communication session of the user group, the terminal device 14 may be excluded from the communication session of the user group. Moreover, if another terminal device newly belongs to the user group in the middle of the communication session of the user group, the terminal device may participate in the session of the group communication from the middle of it.

REFERENCE NUMERALS

11 Server (Relaying device)
12 Management device
13 Wireless access point
14 Terminal device
20 Control unit (of the terminal device)
30 Control unit (of the server)
32 Network communication unit
220 PTT (push-to-talk) switch
242 VOX circuit
301 Terminal table
302 Group table
303 Mixing table (Session table)

What is claimed is:
1. A relaying device comprising:
a network communication unit for communicating with a plurality of terminal devices over a network;

a control unit for controlling the communication with the plurality of terminal devices; and a storage unit in which a group table is stored, the group table including, as groups of terminal devices that perform communications therebetween, a normal group to which the plurality of terminal devices belong in advance, and a user group to which a terminal device that transmits a registration request belongs, wherein when the control unit receives registration request information for requesting registration to the user group from one of the plurality of terminal devices, the control unit registers the one of the plurality of terminal devices in the group table so as to belong to the user group, after two or more terminal devices are registered to belong to the user group, when the control unit receives a voice signal from the one of the plurality of terminal devices belonging to the user group destined to the user group, the control unit transfers the voice signal to all of other terminal devices belonging to the user group.

2. The relaying device according to claim 1, wherein
the group table includes a plurality of user group registering area described therein in advance, and
the control unit transmits information about at least one of the plurality of user groups as a registration-requestable group to each terminal device.

3. The relaying device according to claim 1, wherein
when the terminal device belonging to the normal group in advance is made to belong to the user group, the control unit temporarily deletes the terminal device from the normal group.

4. The relaying device according to claim 1, wherein
the registration request information is added to the voice signal and transmitted from the terminal device.

5. A voice communication system having a plurality of terminal devices and a relaying device which transmit/receive a voice signal with each other over a network, wherein the relaying device has a group table including, as groups of terminal devices that perform communications therebetween, a normal group to which the plurality of terminal devices belong in advance, and a user group to which a terminal device that transmits a registration request belongs, the terminal device transmits registration request information for requesting registration to the user group to which the terminal device itself belongs to the relaying device, when the relaying device receives the registration request information from the terminal device, the relaying device registers the terminal device in the group table so as to belong to the user group, after two or more terminal devices are registered to belong to the user group, the terminal device transmits the voice signal destined to the user group to which the terminal device itself belongs to the relaying device, and when the relaying device receives the voice signal destined to the user group from the terminal device, the relaying device transfers the voice signal to all of other terminal devices belonging to the user group.

6. A voice communication method in which a plurality of terminal devices connected over a network transmit/receive a voice signal via a relaying device, wherein the relaying device is provided with a group table including, as groups of terminal devices that perform communications therebetween, a normal group to which the plurality of terminal devices belong in advance, and a user group to which a terminal device that transmits a registration request belongs, a terminal device transmits registration request information for requesting registration to the user group to which the terminal device itself belongs to the relaying device, when the relaying device receives the registration request information from the terminal device, the relaying device registers the terminal device in a group table so as to belong to the user group, after two or more terminal devices are registered to belong to the user group, the terminal device transmits the voice signal destined to the user group to which the terminal device itself belongs to the relaying device, when the relaying device receives the voice signal destined to the user group from the terminal device, the relaying device transfers the voice signal to all of other terminal devices belonging to the user group.

* * * * *